(No Model.)

W. K. CONNESS.
AIR BRAKE SLACK ADJUSTER.

No. 587,519. Patented Aug. 3, 1897.

Witnesses,

Inventor,
Walter K. Conness
By Dewey & Co
Attys

THE NORRIS PETERS CO., PHOTO-LITHO., WASHINGTON, D. C.

UNITED STATES PATENT OFFICE.

WALTER K. CONNESS, OF OAKLAND, CALIFORNIA.

AIR-BRAKE SLACK-ADJUSTER.

SPECIFICATION forming part of Letters Patent No. 587,519, dated August 3, 1897.

Application filed November 27, 1896. Serial No. 613,515. (No model.)

*To all whom it may concern:*

Be it known that I, WALTER K. CONNESS, a citizen of the United States, residing at Oakland, county of Alameda, State of California, have invented an Improvement in Air-Brake Slack-Adjusters; and I hereby declare the following to be a full, clear, and exact description of the same.

My invention relates to a device which is especially designed for automatically taking up the slack of the bottom rod of car-brakes as fast as the wear of the shoes or other parts produces such slack.

My invention is applicable to air or other brakes as applied to either four or six No. 1 wheeled trucks; and it consists in details of construction which will be more fully explained by reference to the accompanying drawings, in which—

Figure 1:
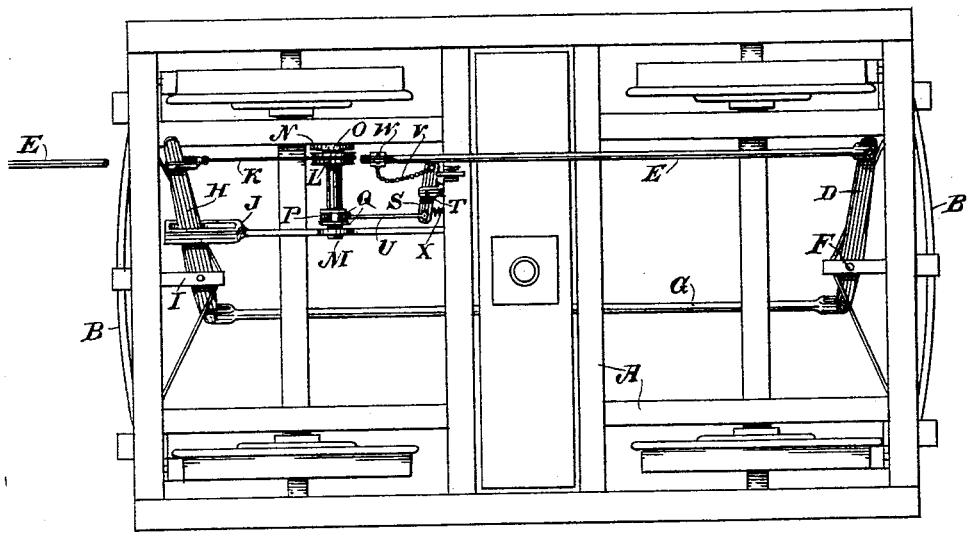
Figure 2:
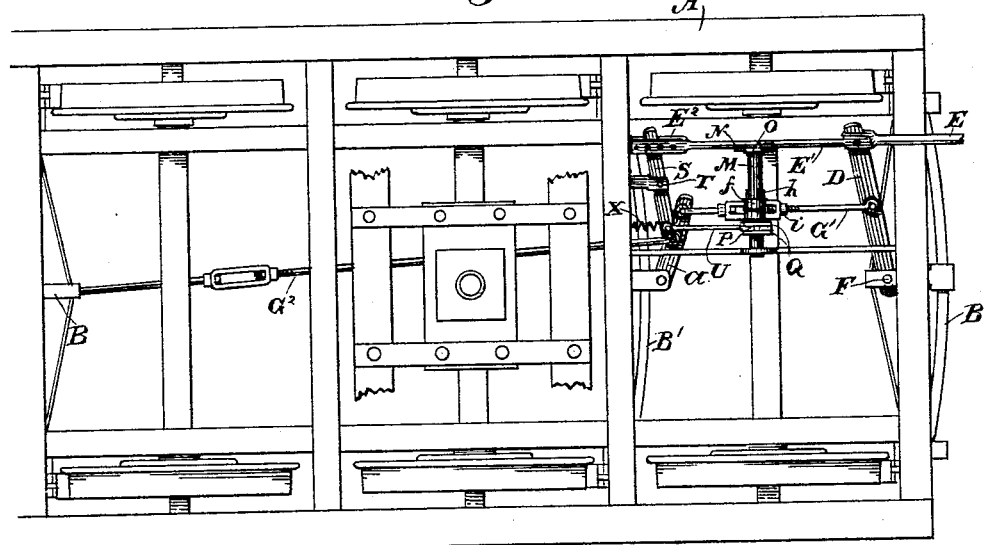
Figure 3:
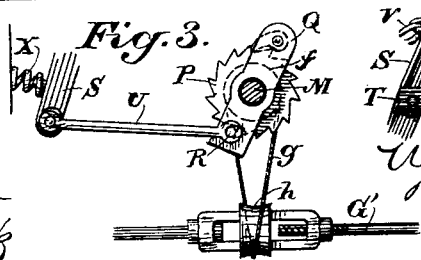
Figure 4:

Figure 1 is a plan view of a four-wheeled truck, showing the device as applied to it. Fig. 2 shows its application to a six-wheeled truck. Fig. 3 is a detail of the ratchet-wheel and its connection with the bottom-rod turnbuckle. Fig. 4 is a detail of the locking device in case of breakage.

A is the truck-frame, consisting of the truck end pieces, the side sills or wheel-pieces, and the transom extending transversely across, approximately about the center. The wheel-axles are journaled in boxes upon the truck-frame in any usual or suitable manner. (Not here shown.)

The brake-beams B carry shoes, which are applied against the peripheries of the wheels when the brake is to be set.

D is the "live-lever," so called, from one end of which a rod E extends to the float or cylinder lever when the device is connected with the air-brake mechanism, or it may be connected with any other device through which power is applied to set the brakes. The live-lever is fulcrumed at F to a connection with the right-end brake-beam, as shown in the drawings, and its opposite end is connected by a rod G with one end of the dead-lever H, as shown in Fig. 1. In the six-wheel truck, Fig. 2, the connection is made to an intermediate lever a, which is fulcrumed upon the brake-beam of the intermediate wheels and thence by rod $G^2$ to the brake-beam B' at the opposite end. These connections will apply all of the brakes at once.

In Fig. 1 I connect the end of the lever H with a chain K. This chain passes around a pulley L, which is fixed upon a transverse shaft M, suitably journaled upon the truck-frame. This shaft has upon one end a ratchet-wheel N and a pawl O, which serve to hold the shaft at any point when it is turned to take up the slack by rotating the shaft M and pulling upon the chain K. In the center of the shaft M, at some point intermediate between its ends, is fixed a ratchet-wheel P. (Plainly shown in Fig. 3.) This ratchet-wheel lies between two arms Q, which are turnable loosely upon the shaft M and which have a rod or pin R extending between them at such point that this rod is movable over the teeth of the ratchet P, yielding so as to advance over one tooth without moving the ratchet when moved in one direction, but acting to press against the tooth and rotate the ratchet and the shaft M when turned in the other direction, and this action advances the ratchet-wheel N, so that its pawl O will move over one tooth and engage the next one. This holds the shaft and retains the take-up caused by winding the chain K upon the pulley L. The device for moving the arms Q with their rod R to produce this result is constructed as follows:

S is a lever fulcrumed to the transom or other suitable part of the truck-frame, as shown at T. One end of this lever is connected by a rod U with the pin R or the lower swinging end of the arms Q, and the other end is connected by a chain V with a collar W, which is fixed upon the rod E, previously described as extending from the live-lever to the cylinder-lever or source by which the brake is applied, as shown in Fig. 1, and, as shown in Fig. 2, the lever S is connected by an intermediate rod and link $E^2$ in line with the power-rod E.

X is a spring connecting with the lever S and normally pressing the lower end of the lever outwardly. When this spring is compressed by any pull upon the lever in setting the brakes, the latter acts through its rod U to draw the pin R over a tooth of the ratchet P, and when the lever S is released the spring acts to force it (the rod U) and the pin R against the ratchet P, thus moving it and rotating the shaft M until the pawl O is advanced a tooth upon the ratchet N. This operation will be effected by the movement of the rod E. The slack of the chain V or the yoke E² is sufficient to ordinarily allow the rod E to move and apply the brakes whenever power is applied to it, and this movement will not produce any other result until the brake-shoes or other parts have become so worn that there is too much slack in the parts. Then the pull upon the rod E will take up the slack of the chain V or the yoke sufficiently to allow it to pull the lever S about its fulcrum and thus act upon the rod U and pin R, as previously described. In this manner the slack will be always taken up automatically as fast as the wear takes place.

When the device is applied to a truck of more than four wheels, there are two brake-beams situated at opposite sides of the two outer pairs of the wheels, and another brake-beam B' situated upon the outside of the third or middle pair of wheels. The connections in this case are the live-lever D, the rod E, connecting it with the cylinder or source of power, and the bottom rods G', one of which extends from the right outside brake-beam B, Fig. 2, to a short lever $a$, fulcrumed upon the inner brake-beam B, while the other bottom rod G² connects the left outside brake-beam B with the lever $a$, as shown. In this case the live-lever rod may be extended beyond the lever and connect with a lever S, as before stated, this lever being fulcrumed at T. The operation of this mechanism is essentially equivalent to the operation of the lever S by the same rod in the four-wheeled-truck construction.

The movement of the ratchet-wheel P turns the shaft M, and this shaft carries a pulley $f$. Around this pulley passes an endless chain $g$, and it also passes around another pulley $h$, which is fixed to a turnbuckle $i$. This turnbuckle is introduced between the two parts of the bottom rod G' and serves to turn this rod and by means of the screw-threads to compensate for the slack caused by the wear of the brake-shoes in the same manner as described for the four-wheeled truck, the operation being automatically effected by the reciprocating movement of the rod E, the intermediate mechanism only differing to accommodate itself to the slightly-different form of connections employed upon the truck of more than four wheels. The lever S has a notch $s$ made in it, and Y is a gravity-pawl which in case of breakage will engage the notch and lock the lever against further movement. This pawl and notch is intended to prevent the lever from moving beyond a certain point in case the chain V, which connects it with the live-lever brake-rod, should become broken. In this case the lever will fall back only to the point where the pawl will engage the notch, and this limits the movement of the opposite end of the lever, the connecting-rod, and the swinging yoke Q.

Having thus described my invention, what I claim as new, and desire to secure by Letters Patent, is—

1. The combination with a car-truck, wheels, brake beam, and shoes and brake-actuating lever, of a rotary shaft having a pulley fixed upon it, a connection between a second brake-actuating lever and the pulley, a holding ratchet-wheel fixed upon the shaft and a pawl engaging said ratchet-wheel, arms turning loosely upon the shaft having a pin connecting them, a second ratchet-wheel intermediate between the arms adapted to be engaged by the connecting-pin when the arms are caused to swing upon the shaft, an intermediate mechanism connecting the arms with the live-lever rod, whereby the arms are moved and the ratchet-shaft actuated whenever the parts become slack from wear.

2. The combination with a car-truck, bearing-wheels, brake-beam, shoes, and actuating mechanism, of an independent rotary shaft having a pulley fixed upon it, a pawl-and-ratchet mechanism whereby the shaft is intermittently rotated, an intermediate lever connected and movable in unison with the live-lever, connections between this lever and the ratchet upon the independent shaft, a turnbuckle fitted in the length of the bottom brake-lever rod, and pulleys upon the ratchet-shaft and the turnbuckle whereby the latter is turned in unison with the shaft to compensate for wear of the operative parts.

3. The combination with the brake-actuating mechanism of a car-truck, of an intermediate take-up mechanism and operating-lever, and a pawl adapted to engage a notch in said lever to lock it against further movement in case of breakage.

In witness whereof I have hereunto set my hand.

WALTER K. CONNESS.

Witnesses:
S. H. NOURSE,
H. F. ASCHECK.